United States Patent [19]
Friedrich et al.

[11] Patent Number: 5,511,465
[45] Date of Patent: Apr. 30, 1996

[54] COMBO GRINDER AND BREWER

[75] Inventors: Brent R. Friedrich, Springfield; John T. Knepler, Chatham, both of Ill.

[73] Assignee: Bunn-O-Matic Corporation, Springfield, Ill.

[21] Appl. No.: 511,133

[22] Filed: Aug. 4, 1995

Related U.S. Application Data

[63] Continuation-in-part of Ser. No. 371,293, Jan. 11, 1995, Pat. No. 5,465,650.

[51] Int. Cl.⁶ .................................. A47J 31/42
[52] U.S. Cl. ..................... 99/286; 99/289 R; 99/295; 99/305
[58] Field of Search .................. 99/286, 289 R, 99/290, 295, 300, 302 R, 304, 305, 279, 280, 281, 282, 283, 284, 285; 426/433

[56] References Cited

U.S. PATENT DOCUMENTS

| | | | |
|---|---|---|---|
| 4,464,981 | 8/1984 | Stover | 99/305 |
| 4,971,259 | 11/1990 | Nidiffer . | |
| 5,083,502 | 1/1992 | Enomoto | 99/286 |
| 5,186,399 | 2/1993 | Knepler et al. . | |
| 5,224,414 | 7/1993 | Hunt | 99/286 |
| 5,322,005 | 7/1994 | Enomoto | 99/286 |

*Primary Examiner*—Robert W. Jenkins
*Attorney, Agent, or Firm*—Trexler, Bushnell, Giangiorgi & Blackstone, Ltd.

[57] ABSTRACT

A beverage brewing apparatus which includes a substance dispensing device and a brewing device. The brewing apparatus includes a receptacle for receiving a brewing substance from the substance dispensing device, a movable chute positioned between the substance dispensing device and the receptacle, and a water dispensing system operatively associated with the brewing device and selectively communicating with the receptacle for delivering water to a brewing substance retained therein. Additionally, a drive assembly is provided to operatively displace the water dispensing device relative to the receptacle. When the water dispensing device is positioned in communication with the receptacle, the chute is moved out of communication with the receptacle. When the water dispensing device is removed from communication with the receptacle, the chute is placed in communication with the receptacle. The present invention also includes a seal attached to the water dispensing device to seal the water dispensing device while dispensing water to prevent the escape of moisture from the water dispensing device. The apparatus includes a sensor for detecting when a funnel is not present for brewing a beverage or when the funnel has not been recharged and replaced after brewing a beverage and upon initiating a subsequent beverage brewing cycle.

21 Claims, 6 Drawing Sheets

COMBO GRINDER AND BREWER

CROSS-REFERENCE

This is a continuation-in-part of U.S. patent application Ser. No. 08/371,293 filed Jan. 11, 1995, now U.S. Pat. No. 5,465,650.

BACKGROUND

The present invention relates to brewing apparatus for producing a brewed beverage from a beverage brewing substance. More particularly, the present invention includes a beverage brewing apparatus having a brewing device and a substance dispensing device.

In recent years it has become increasingly popular for restaurants, franchise operations and other food service institutions to serve fresh brewed coffee from "fresh-ground" coffee beans. This popularity has created an increasing demand for coffee bean grinders to provide such fresh ground coffee. A variety of coffee grinders are available from a variety of manufacturers which store a large quantity of beans for dispensing to a grinding mechanism. In many settings, one grinder will be used to grind both regular coffee and decaffeinated coffee. These dual purpose grinders include two hoppers and a mechanism for selectively dispensing beans from one of the hoppers.

Many grinders provide structures for retaining a brewing funnel or receptacle near the outlet of the grinder so as to catch the grounds as they are dispensed from the grinder. User selectable controls are provided to allow a user to select a predetermined quantity of coffee. Also, grinders have been developed which interactively weigh the ground coffee dispensed from the grinders so as to accurately produce a required quantity of coffee.

A problem with using prior art devices is that an operator is required to carry out several steps in order to brew coffee. For example, the operator must prepare a brewing funnel with a filter paper, position the brewing funnel on the grinder to catch the ground coffee dispensed by the grinder, select a quantity of coffee to be ground, activate the grinder, remove the brewing funnel and ground coffee from grinder and place the brewing funnel in the brewing device, and set up the brewing device for the desired volume of brewed coffee and initiate the brewing cycle. The numerous steps in setting up and initiating the brew cycle as well as the placement, removal and replacement of the brewing funnel create many opportunities for problems to arise and errors to occur.

For example, if the funnel is not carefully moved from the grinder to the brewer the grounds could be spilled or contaminated. Additionally, the quantity of coffee ground by the grinder and the volume of coffee to be brewed at the brewer is prone to operator error and could be incorrectly set up. In other words, if an operator selects a quantity of ground coffee sufficient to brew a full pot of coffee, and then sets up the brewer to brew a half pot of coffee, the half pot of coffee will be undesirably strong since half the quantity of brewing water is used with a quantity of ground sufficient to brew a full pot. Similarly, too little ground coffee can be used with too much water resulting in a weak and often times bitter tasting brewed beverage.

The food preparation industry is striving for greater and greater automation to reduce errors, provide greater consistency, and increase efficiency. Current coffee brewing technology generally provides a satisfactory beverage when the coffee brewing devices are properly operated. When an operator does not comply with the prescribed procedures, available technology may not provide optimal results. As such, it would be desirable to provide a coffee brewing apparatus which minimizes the potential for operator error and increases efficiency.

Another problem with the prior art device is that the independent grinder and brewer require considerable counter space. In many areas of the food preparation industry, store space and especially counter space is at a premium. If the footprint for various essential equipment such as coffee grinding and brewing devices could be minimizes, another food preparation device could placed in the excess space or the excess space could-be used for additional food preparation or other product sales. As such, it would be desirable to minimize the counter space requirement, or footprint, of a coffee brewing apparatus and grinder so as to reduce the space requirements for coffee brewing and thus provide more space for other purposes.

OBJECTS AND SUMMARY

A general object satisfied by the present invention is to provide a coffee brewing apparatus which combines a brewing device and brewing substance dispensing device in one apparatus.

Another object satisfied by the present invention is to provide a coffee brewing apparatus which minimizes potential operator error and increases efficiency.

Yet a further object satisfied by the present invention is to provide a unitary coffee brewing apparatus which includes a brewing device and brewing substance dispensing device and which prevents moisture from affecting a store of coffee retained in the dispensing device.

Still a further object satisfied by the present invention is a coffee brewing apparatus which provides an indication to an operator whether a brewing funnel is properly positioned in the apparatus and whether the brewing funnel needs to be checked before initiating a brew cycle.

Briefly, and in accordance with the foregoing, the present invention envisions a beverage brewing apparatus which includes a substance dispensing device and a brewing device. The brewing apparatus includes a receptacle for receiving a brewing substance from the substance dispensing device, a movable chute positioned between the substance dispensing device and the receptacle, and a water dispensing device operatively associated with the brewing device and selectively communicating with the receptacle for delivering water to a brewing substance retained therein. Additionally, a drive assembly is provided to operatively displace the water dispensing device relative to the receptacle. When the water dispensing device is positioned in communication with the receptacle, the chute is moved out of communication with the receptacle. When the water dispensing device is removed from communication with the receptacle, the chute is placed in communication with the receptacle. The present invention also includes a seal attached to the water dispensing device to seal the water dispensing device while dispensing water to prevent the escape of moisture from the water dispensing device. The apparatus includes a sensor for detecting when a funnel is not present for brewing a beverage or when the funnel has not been recharged and replaced after brewing a beverage and upon initiating a subsequent beverage brewing cycle.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

While the invention may be susceptible to embodiment in different forms, there is shown in the drawings, and herein will be described in detail, embodiments with the understanding that the present description is to be considered an exemplification of the principles of the invention and is not intended to limit the invention to that as illustrated and described herein.

Figures 1, 2:
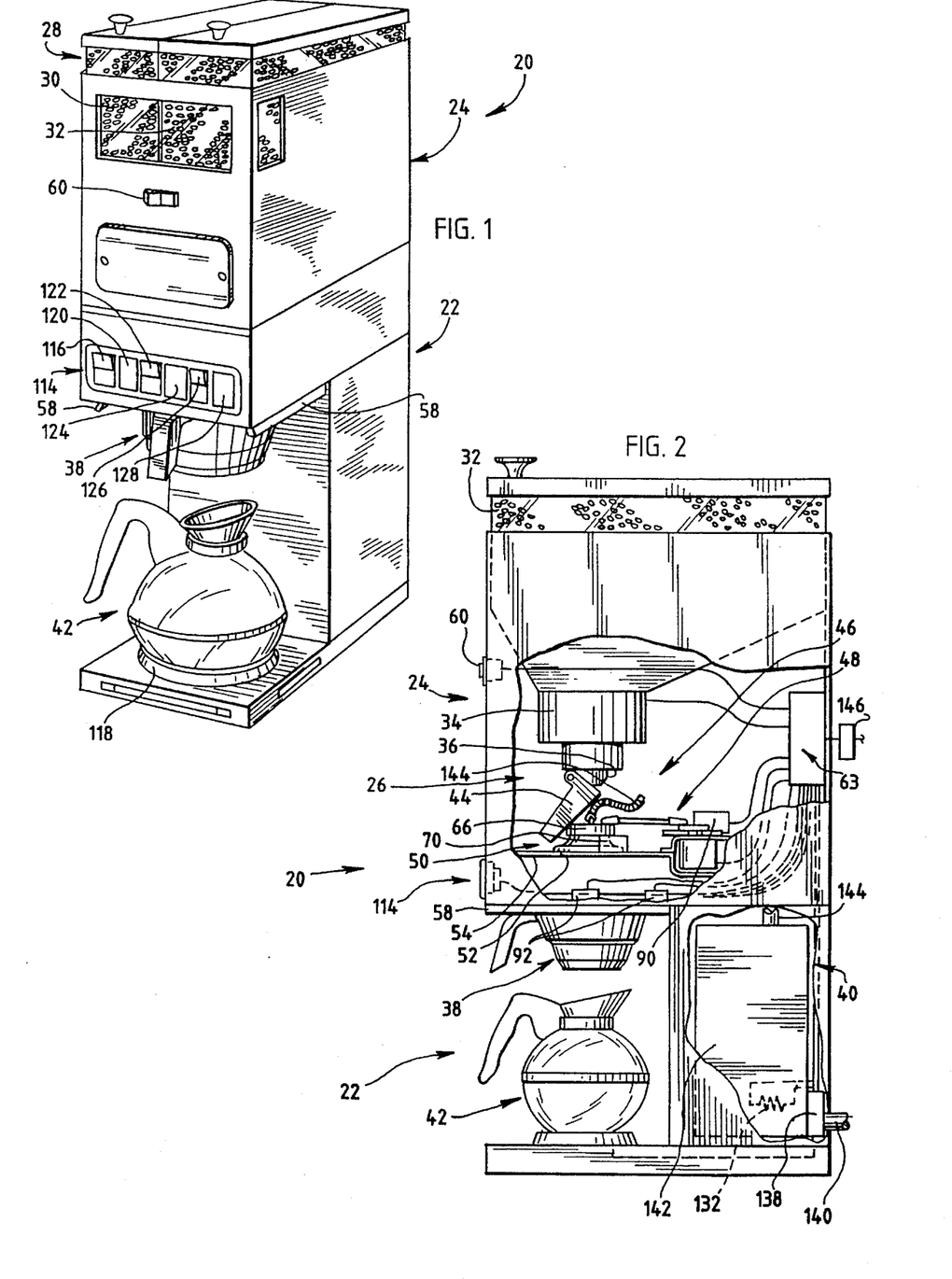
FIG. 1 is a perspective view of a beverage brewing apparatus including a brewing substance dispenser and a brewer.
FIG. 2 is a partial fragmentary, cross-sectional, side elevational view of the beverage brewing apparatus as shown in FIG. 1.

With reference to FIG. 1, a beverage brewing apparatus 20 is shown which includes beverage brewing device or brewer 22 and brewing substance dispensing means or a brewing substance dispenser 24. As shown, the brewing substance dispenser 24 is positioned above the beverage brewer 22 so as to dispense a brewing substance to the beverage brewer 22 in a gravity fed manner. With reference to FIG. 2, means for delivering water and dispensing brewing substance or water delivery and substance dispensing means 26 is provided in the beverage brewing apparatus 20 positioned generally between the brewing substance dispenser 24 and the beverage brewer 22 for controllably directing a brewing substance from the dispenser 24 to the brewer 22 and delivering water to the brewing device, or individually dispensing brewing substance to the brewing device or delivering water to the brewing device.

The dispenser 24 includes a receptacle 28 which is shown in the illustrated embodiment as including a first hopper 30 and a second hopper 32. The illustrated embodiment shows whole bean coffee retained in the hoppers 30, 32 in a gravity feed relationship with a grinder 34 (see FIG. 2). Whole bean coffee is fed from a selected one of the hoppers 30, 32 into the grinder 34 which grinds the beans to a desired consistency and dispenses the brewing substance through an outlet port 36. Brewing substance dispensed through the outlet port 36 must be deposited in a brewing substance receptacle or funnel 38 for infusion with water from a water distribution system 40. The hoppers 30, 32 and grinder 34, as well as the water distribution system 40, are of generally known construction such as is used in coffee brewers and grinders manufactured by Bunn-O-Matic Corporation of Springfield, Ill., assignee of the present invention. When the brewing substance, retained in the funnel 38, is infused with water from the water distribution system 40 a brewed beverage is dispensed from the funnel into a decanter 42 positioned below the funnel 38.

The present invention focuses on the water delivery and substance dispensing means 26 generally positioned between the substance dispenser 24 and the brewer 22. Generally shown in FIG. 2, and more specifically shown in FIGS. 3–6, the water delivery and substance dispensing means 26 includes a chute 44, water dispensing means 46 and drive assembly 48. The drive assembly 48 is attached to a sprayhead assembly 50 of the water dispensing means 46 to pivotally, horizontally and vertically displace the sprayhead assembly 50 relative to an aperture 52 formed in the body 54 of the brewer 22. Operation of the drive assembly 48 and the water dispensing means 46 will be described in further detail hereinbelow.

Figures 3, 4:
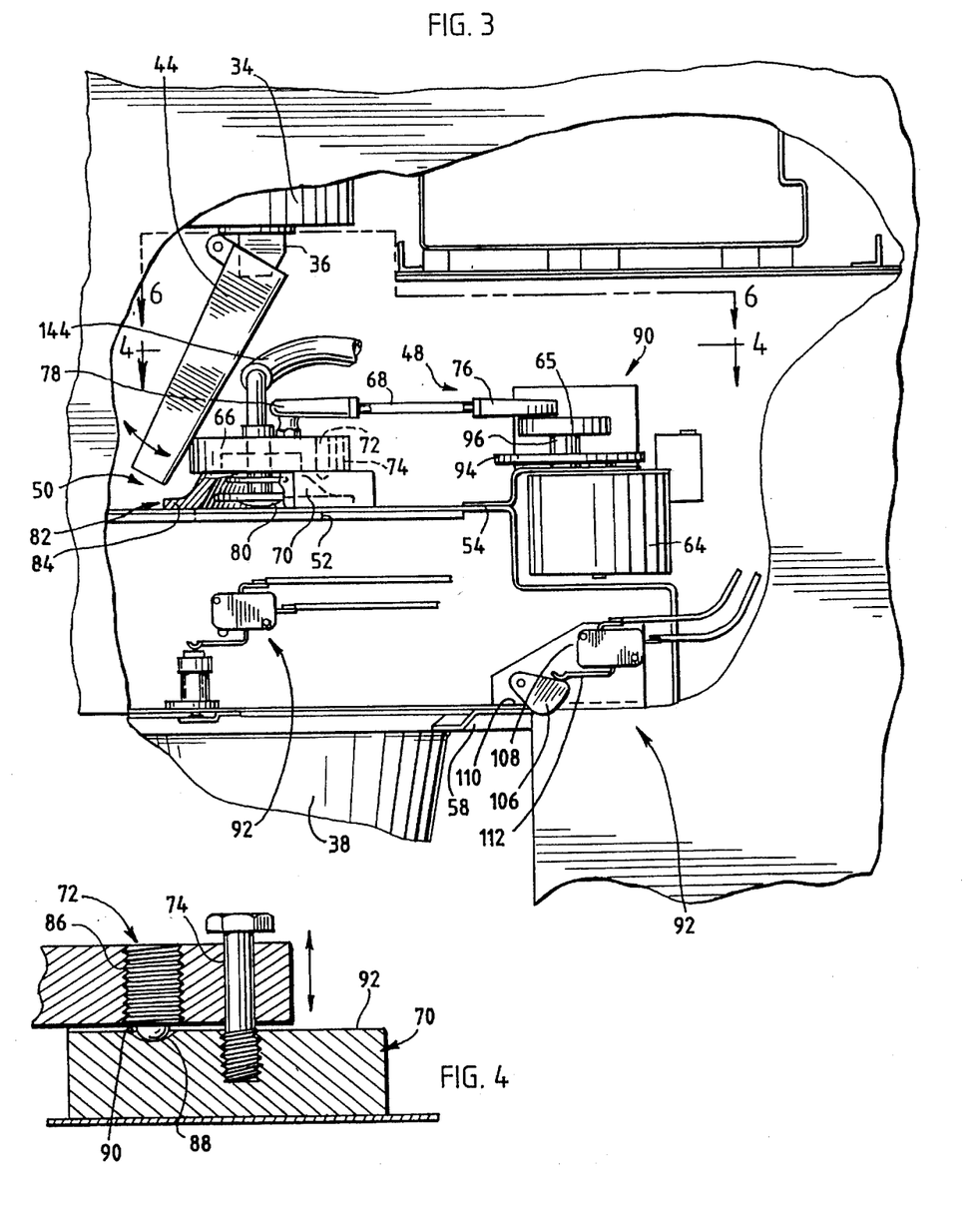
FIG. 3 is an enlarged view of the partial fragmentary, cross-sectional, side elevational view in FIG. 2 to show the details of a movable chute, sprayhead assembly and drive assembly of the present invention.
FIG. 4 is an enlarged, partial fragmentary, cross-sectional view of a portion of the drive assembly to show how the drive assembly vertically displaces the sprayhead assembly.

In general terms, the chute 44 is pivotally attached to the outlet port 36 and leans or rests against the sprayhead assembly 50. When the drive assembly 48 moves the sprayhead assembly 50 away from its position over the aperture 52 the chute 44, leaning or resting against the sprayhead assembly 50, moves into a position whereby the chute 44 provides a path from the outlet port 36 through the aperture 52 to the funnel 38.

Figure 5:
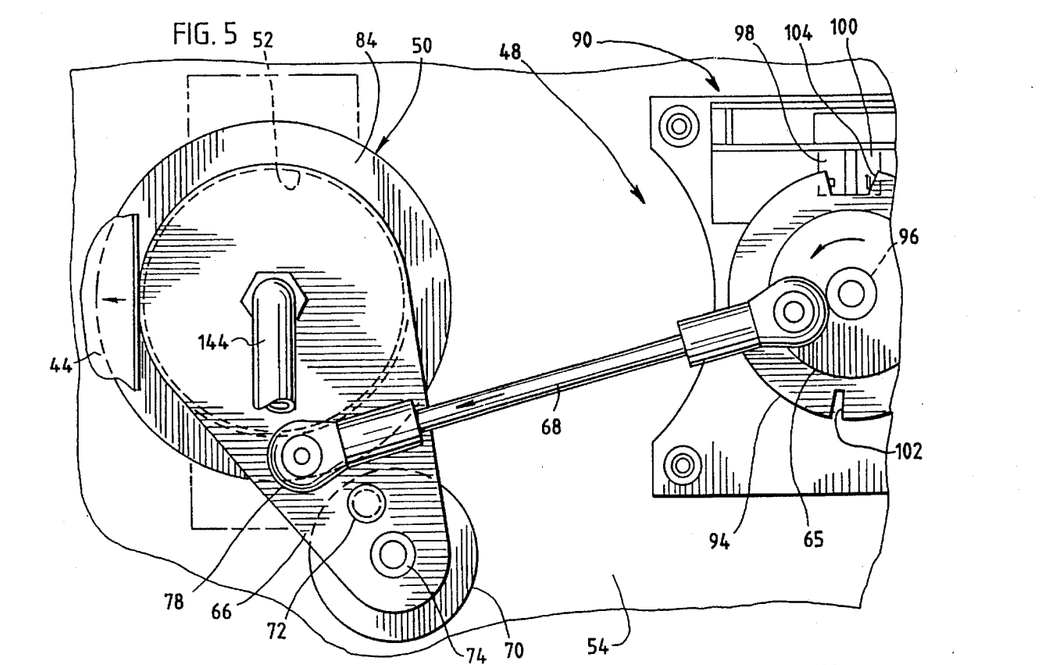
FIG. 5 is a partial fragmentary, cross-sectional, plan view taken along line 4—4 in FIG. 2 showing the sprayhead assembly positioned over an aperture communicating with a receptacle.
Figure 6:
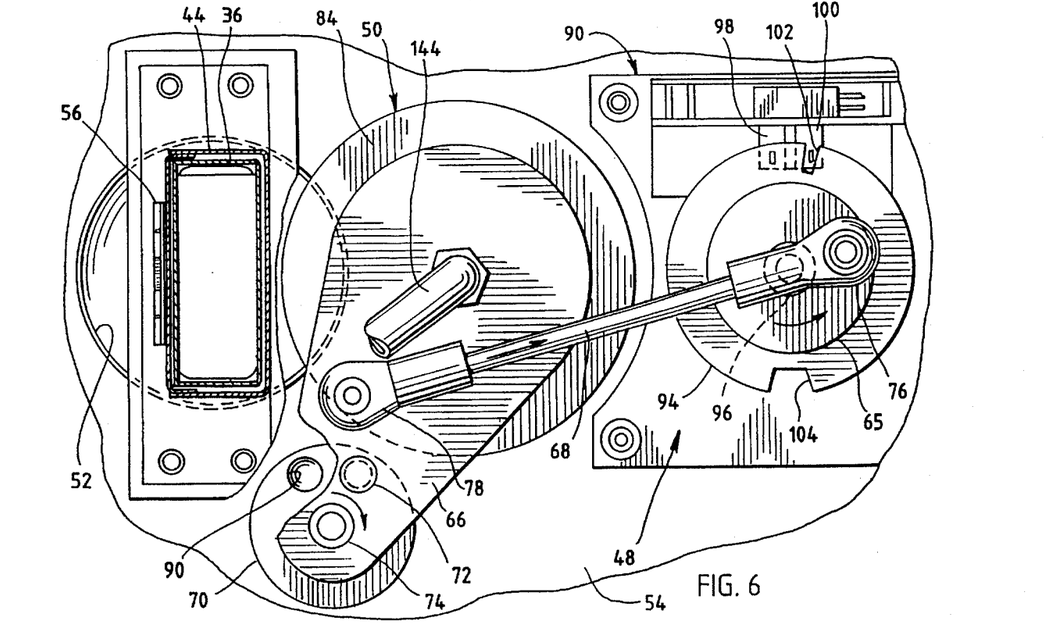
FIG. 6 is similar to the view as shown in FIG. 4 in which the drive assembly has moved the sprayhead assembly away from the aperture to facilitate movement of the chute in position to communicate with the aperture.

Referring now to FIGS. 5 and 6, FIG. 5 shows the sprayhead assembly 50 in engagement over the aperture 52 with the chute (only a fragmentary portion of chute 44 is shown in FIG. 5) positioned away from the aperture 52. The arrangement as shown in FIG. 5 allows water to be dispensed from the sprayhead assembly 50 through the aperture 52 to the funnel 38 below. When the drive assembly 48 is operated to move the sprayhead assembly 50 out of communication with the aperture 52, the chute 44 pivots into position aided by a spring hinge 56 to mate with the outlet port 36 and provide a path through which ground coffee may flow from the grinder 34 to the funnel 38.

In the general operation of the present invention, the funnel 38 is removed and a filter material is placed in the funnel 38. The funnel is slidably engaged with funnel supporting rails 58. The funnel supporting rails 58 retain the funnel 38 in a position below the aperture 52 for receiving ground coffee and water therethrough. A selection switch 60 is operated to select the type of coffee from the hoppers 30, 32. Next, a brew switch is activated which operates a control device 62 to selectively control the water delivery and substance dispensing means 26. Generally, the control means 63 operates the drive assembly 48 to displace the sprayhead assembly 50 allowing the chute 44 to drop into position between the outlet port 36 and the aperture 52.

The grinder 34 is operated for a predetermined period of time to grind whole bean coffee and dispense coffee grounds through the outlet port 36. The grounds pass from the outlet port 36 through the chute 44 and aperture 52 and into the funnel 38 positioned therebelow. At the end of the grind cycle, the control means 63 operates the drive assembly 48 to position the sprayhead assembly 50 over the aperture 52 pushing the chute 44 out the way while pivoting. The control means 63 then operates the water distribution system 40 to dispense water through the sprayhead assembly 50 onto the freshly ground coffee retained in the funnel 38. The ground coffee is infused with the water and a brewed substance is dispensed into the decanter 42.

The proceeding description has presented the general structure and function of the present invention and the following description will now discuss the specific structure and function of the present invention. Turning to FIGS. 2–6, the drive assembly 48 includes a motor 64, a crank or cam 65, a linkage or rod 68 connected at one end to the cam 65 and at an opposite end to a pivot lever 67 of the carriage assembly 66a, a pivot block 70 attached to the body 54 and positioned underneath the pivot lever 67, and a vertical displacing device or spring loaded plunger 72 retained in the pivot lever 67 and abutting the pivot block 70. The pivot lever 67 is attached to the pivot block 70 by a pivot shaft 74 which allows rotary movement of the pivot lever 66 relative to the fixed pivot block 70. The sprayhead assembly 50 is carried on the pivot lever 67 so that the sprayhead assembly 50 is pivoted into and out of communication with the aperture 52 upon moving the pivot lever 67.

The linkage 68 is attached to the cam 65 and the pivot lever 67 to provide reciprocating pivotal movement of the lever 67 relative to the block 70 and the aperture 52. In other words, the eccentric pivotal attachment of a first end 76 of the linkage 68 to the cam 65 reciprocates the pivot lever 67 attached to a second end 78 of the linkage 68. Rotary movement of the cam 65 eccentrically moves the first end 76 towards and away from the aperture 52. The size and dimension of the linkage 68 as well as the placement of the first and second end 76, 78 has been calculated so that the sprayhead assembly 50 is positioned over the aperture 52 when the pivot lever 67 is in an advanced position (as shown in FIG. 5) and that the sprayhead assembly 50 is disengaged from the aperture 52 to allow the chute 44 to communicate with the outlet port 36 and the aperture 52 when the pivot lever 67 is in a retracted position (as shown in FIG. 6).

The sprayhead assembly 50 as shown in FIG. 3 includes a sprayhead 80 and a skirt 82 attached to the pivot lever 67. A rim 84 of the skirt 82 extends radially away from the edge of the aperture 52 to provide a seal between the body 54 and the skirt 82. The seal prevents the escape of moisture into the brewer 22 and the dispenser 24. It is important to prevent the escape of moisture so that the components or contents of the apparatus 20 are not adversely affected. One problem that occurs with the escape of moisture is clumping or clustering of the brewing substance in the hoppers. If the beans clump, they cannot flow from the hopper when a gate (not shown) is moved. Since the beans do not flow, flow irregularly or slowly, the measuring of the beans for grinding will be inaccurate. By reducing the escape of moisture from the sprayhead assembly, bean clumping is kept to a minimum and operational problems are prevented.

Accommodations must be made for the skirt 82 such that the sprayhead assembly 50 must be slightly vertically displaced when moving the pivot lever 67 to disengage the rim 84 from the body 54. The spring plunger 72 mentioned hereinabove is retained in the pivot lever 67 and acts against the block 70 to facilitate vertical displacement of the pivot lever 67 and attached sprayhead assembly 50. The spring plunger 72 is of known construction having a generally threaded body portion 86, a plunger head 88 and a biasing mechanism retained within the body 86 which acts against the plunger head. The biasing mechanism maintains the plunger head in an advanced position generally extending from the body 86. A recess 90 is formed in the surface 92 of the pivot block 70. The recess 90 is sized and dimensioned to receive the plugger head 88 and is positioned on the surface 92 such that the plunger head 88 is received therein when the pivot lever 67 is positioned in the advanced position (as shown in FIG. 5) in which the sprayhead assembly 50 communicates with the aperture 52. When the pivot lever 67 is reciprocated, the plunger head 88 rotates out of the recess 90 to slightly vertically displace the pivot lever 67 as it rides across the top surface 92 of the pivot block 70. The slight vertical displacement disengages the rim 84 from the body 54 thereby breaking the seal between the sprayhead assembly 50 to allow ease of movement.

A sensor assembly 90 is associated with the drive assembly 48 and is coupled to the control means 63 to sense the position of the pivot lever 67. A receptacle sensor 92 is also provided to sense the position of the funnel 38 in the funnel rails 58. The sensor assembly 90 includes a sensor shutter or sensor disk 94 attached to a shaft 96 coupling the cam 65 to the motor 64. Rotation of the cam 65 by the motor 64 results in the corresponding rotation of the shutter or sensor disk 94.

A first and a second detector 98, 100 are provided on the sensor assembly 90 to sense the position of the disk 94 by detecting the position of a first and second indicator or first and second notch 102, 104. With reference to FIGS. 5 and 6, the detectors 98, 100 sense the second indicator second notch 104 thereby indicating that the sprayhead assembly 50 is positioned over the aperture 52. When the second detector 100 senses the first indicator or first notch 102, the sprayhead assembly 50 is indicated as being disengaged from the aperture 52. The sensor assembly 90 provides feedback information to the control means 63 to indicate the position of the sprayhead assembly 50. The sensors 92 are also coupled to the control means 63 to provide information about the position of the funnel 38.

The receptacle sensor 92 includes a pivoting lever 106 associated with a switch 108. When the funnel 38 is in the forward most position in the funnel rails (as shown in FIG. 3) a forward lip 110 of the funnel displaces the lever 106 thereby contacting an actuator 112 of the switch 108 indicating the position of the funnel 38.

A switch panel 114 is provided in an easily accessible location such as on the front surface of the brewing apparatus 20 as shown in FIG. 1. The switch panel 114 includes a number of switches which are connected to the control means 63. A warmer switch 116 is provided to activate and deactivate a warmer plate 118 for warming the decanter 42. By coupling the warmer switch 116 to the control means 63, the warmer switch 116 acts to control the brew cycle. The warmer switch 116 must be activated before the brew cycle is initiated.

A funnel check indicator 120 is a safety indicator which warns an operator to check the funnel before initiating a brewing cycle. The check funnel indicator 120 is preferably a light of known construction connected to the control means 63. The check funnel indicator 120 prevents brewing two cycles in a row without first removing the funnel and disposing of spent grounds. This indicator 120 is coupled to the control means 63 which will illuminate the indicator if the funnel sensor is not triggered between brewing cycles. In other words, if the funnel 38 is not removed at the end of a brewing cycle and an operator tries to initiate a new brewing cycle, the control means 63 will illuminate the check funnel since the sensor 92 has not been reset by removal and replacement of the funnel 38.

A "grind/brew" or "brew only" switch 122 allows an operator to choose to grind and brew coffee or to only brew coffee by selecting one of the two choices at the switch 122. If the "grind/brew" selection is made at the switch 122, once the brew cycle is activated the dispensing device 124 will dispense a quantity of ground coffee sufficient to brew a required quantity of coffee into the funnel 38. If the "brew only" selection is made at switch 122, the dispenser 24 will be locked out and prevented from operation. The "brew only" selection at the switch 122 requires a user to place user selected grounds in the funnel 38 or the apparatus 20 to brew a beverage.

A "funnel out" indicator 124 is coupled to the control means 63 to indicate when the funnel is not in place between the funnel rails 58. When the funnel 38 is not in place, the "funnel out" indicator will be illuminated by the control means which is coupled to the funnel sensors 92. If the control means 63 illuminates the "funnel out" indicator 124, the dispenser 24 and brewer 22 are locked out from operation until the funnel condition is checked and the funnel sensor 92 indicates that the funnel is in place.

A "start brew" cycle switch 126 must be pressed to initiate a brew cycle. The switch 126 will send a signal to the control means 63 indicating that the operator wishes to initiate a brewing cycle. If the other conditions discussed hereinabove have not been met, the control means will not allow a brew cycle to begin. This will require the user to check the preceding switches and indicators to make sure that the appropriate selections have been made. If all the preceding conditions have been met, the brew cycle will initiate upon actuating the start switch 126.

A final indicator on the switch panel 114 is a "ready" light 128 which indicates when the water in the water distribution system 40 is at an appropriate temperature. The "ready" indicator 128 is coupled to the control means 63 which senses temperature in the water distribution system 40 by well known temperature sensing techniques such as thermocouples or thermostats.

Figure 7:
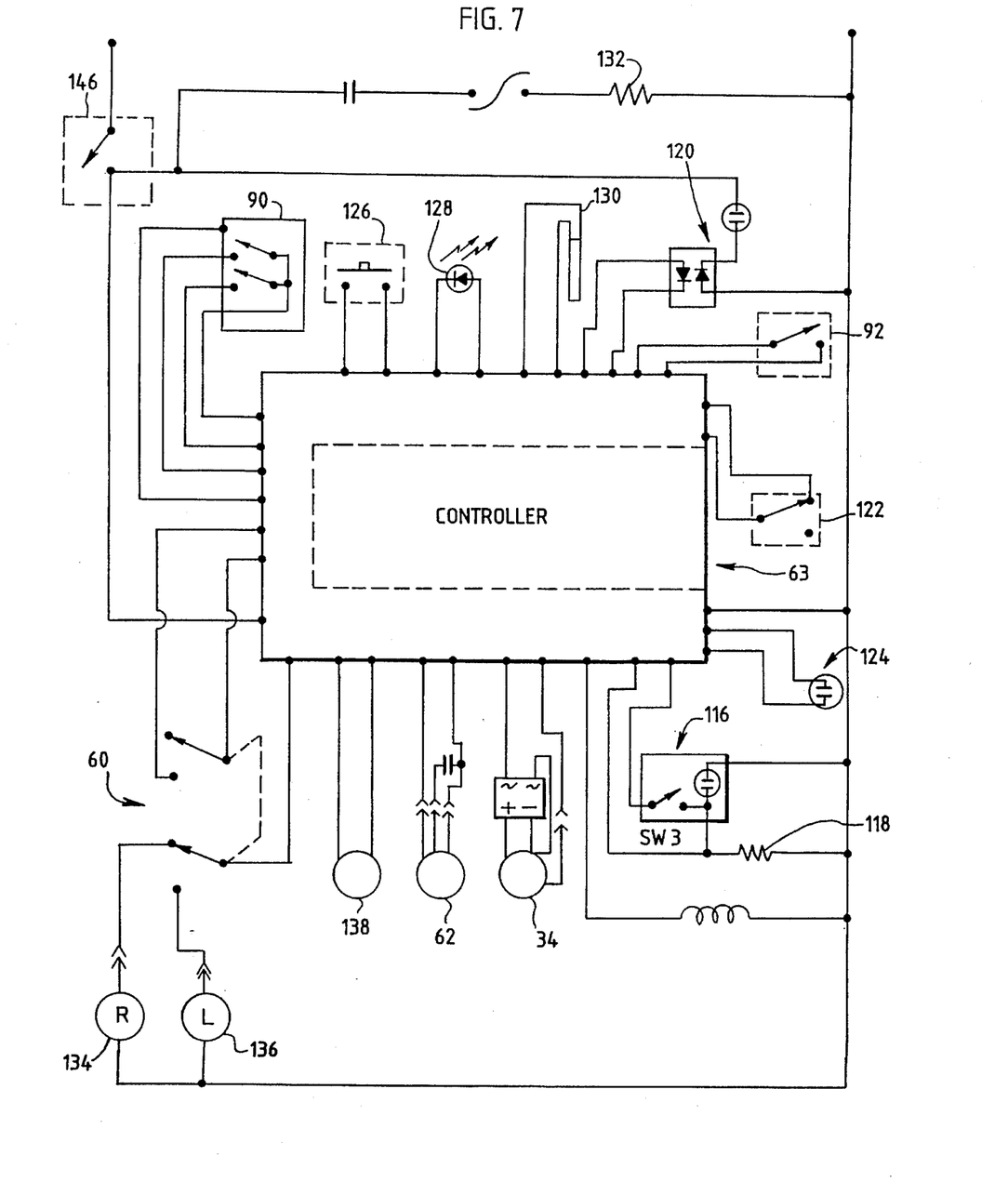
FIG. 7 is a schematic diagram of the beverage brewing apparatus of the present invention.

Turning now to FIG. 7, the control means 63 is shown connected to the numerous switches and devices of the beverage brewing apparatus 20. As shown in FIG. 7, a thermostat 130 is coupled to the control means 63. A thermostat is disposed relative to the water distribution system 40 to sense the temperature of the water used in brewing the beverage. A reservoir heater 132 is connected to the overall circuit. The reservoir heater is associated with the water distribution system 40 in a known manner so as to heat the water retained in a reservoir of the water distribution system. The "ready" indicator 128 is coupled to the controller 63 and is responsive to the thermostat 130 such that when the thermostat indicates a desired temperature is achieved, the "ready" light 128 is activated. When the temperature falls outside of a desired range of temperatures, the thermostat 130 senses the deviation and the controller 63 activates the reservoir heater 132 in response to the thermostat 130.

The warmer switch 116 is coupled to the controller 63 which activates the warmer 118 when the switch 116 is operated.

The funnel switch 92 is coupled to the controller 63 and indicates when the funnel 38 is in the funnel rails 58. The controller activates the "funnel out" indicator 124 when the funnel switch 92 indicates that the funnel is missing from the rails 58.

The grinder selection switch 60 is operated to select one of the hoppers 30, 32. Hopper solenoids 134, 136 operate a dispensing mechanism (not shown) in corresponding hoppers 30, 32, respectively. The dispensing mechanisms are of known construction such as slide gates which are operated by solenoids. When the grinder selection switch 60 is activated, one of the dispensing mechanisms 134, 136 will operate to dispense beans from the selected hopper 30, 32 to the grinder 34. The grinder 34 is coupled to the control means 63 and is operated for a predetermined period of time to grind the beans dispensed from one of the selected hoppers 30, 32.

Prior to the operation of the grinder 34, the drive motor 64 which is coupled to the controller 63 must be operated to move the sprayhead assembly 50 away from the aperture 52. The sprayhead position sensor assembly 90 is coupled to the controller 63 to indicate the position of the pivot lever 67 and provide feedback to the controller 63. Once the sprayhead assembly 50 is positioned away from the aperture 52, the chute 44 drops into place. When the sensor assembly 90 indicates that the sprayhead assembly is thus positioned, the grinder 34 is actuated to start grinding beans from the selected hopper.

The grinder 34 operates for a predetermined period of time corresponding to the selected quantity of coffee to be brewed whereupon the dispensing device 134, 136 for the selected hopper is actuated to close the feed from the selected hopper. The grinder 34 is operated to clear out the dispensed bean and, if desirable, provide an overgrind to clear out any fines or chaff. After a preset dwell time, the motor 62 is actuated to position the sprayhead assembly 50 over the aperture 52 in preparation for infusing the freshly ground brewing substance with heated water from the water distribution system 40.

Once the sensor assembly 90 indicates that the sprayhead 50 is in the proper position over the aperture 52 an inlet water solenoid valve 138 coupled to an inlet water line 140 is operated to allow water to enter a reservoir 142 of the water distribution system 40 thereby forcing water through a water line 144 connected to the sprayhead 80. Water is dispensed through the sprayhead 80 over the grounds retained in the funnel 38 for a predetermined period of time at which point the solenoid valve 138 is operated by the controllers 63 to stop the inflow of water through the inlet line 140. Stopping the inflow of water from the inlet line 140 ceases the dispensing of water over the brewing substance thereby completing the water dispensing portion of the brewing cycle. A general power switch 146 is coupled to the circuit shown in FIG. 7 to provide power to the circuit.

In use, the beverage brewing apparatus 20 of the present invention is designed to grind whole bean coffee directly into the funnel 38 and brew up to a full decanter 42 of final product. First, the operator loads whole bean coffee into the hoppers 30, 32. Next, the operator selects the type of bean to be dispensed by use of the selection switch 60. The brew funnel 30 is removed from the rails 58 to remove any spent beverage brewing substance and place a fresh coffee filter therein. The funnel 38 is reinserted between the rails 58 and the lower warmer switch 116 is moved into the on position.

The "grind/brew-brew only" switch 122 is operated to grind coffee from the selected hopper. The start switch 126 is activated to initiate the brewing cycle. The brewing cycle will start as long as the prerequisites for brewing are met and the control means 63 acknowledges the satisfaction of these prerequisites.

In the first embodiment shown in FIGS. 2–6, the drive assembly 48 will then pivot the pivot lever 66 to move the sprayhead assembly 50 out of engagement with the aperture 52. As the motor 64 drives the drive assembly 48, the pivot lever 66 is slightly upwardly displaced by way of the spring loaded plunger 72 operating against the pivot block 70. The slight vertical displacement of the sprayhead assembly 50 disengages the seal formed between the rim 84 and the body 54.

As the sprayhead assembly 50 is pivoted away from the aperture 52, the chute 44 swings into position to dispense ground coffee from the grinder 34 directly through the aperture 52 into the funnel 38. Ground coffee is dispensed into the funnel 38 as described hereinabove. After a sufficient quantity of ground coffee has been dispensed, the grinder 34 is stopped and the motor 64 operates the drive assembly 48 to reposition the sprayhead assembly 50 over the aperture 52. As the pivot lever 67 rotates, the spring loaded plunger 72 moves until it engages the recess 90 formed in the upper surface 92 of the pivot block 70.

The sensor assembly 90 will indicate that the sprayhead assembly 50 is in the appropriate location whereupon the water distribution system 40 will deliver water through the water line 144 to the sprayhead 80 of the sprayhead assembly 50. Dispensing water onto the grounds in the funnel 38 will produce a brewed beverage which is dispensed into the decanter 42 therebelow. At the completion of the brewing cycle, the check funnel indicator 120 will be activated to inform the operator that the funnel needs to be checked before a new brewing cycle can begin. As previously discussed, the "grind/brew-brew only" switch 122 allows the apparatus 20 to be used as a brewer only or as grinder brewer as disclosed more specifically hereinabove. The interlock switch or funnel sensor 92 will lock out operation of the apparatus 20 if the funnel 32 is not properly positioned.

Figure 8:
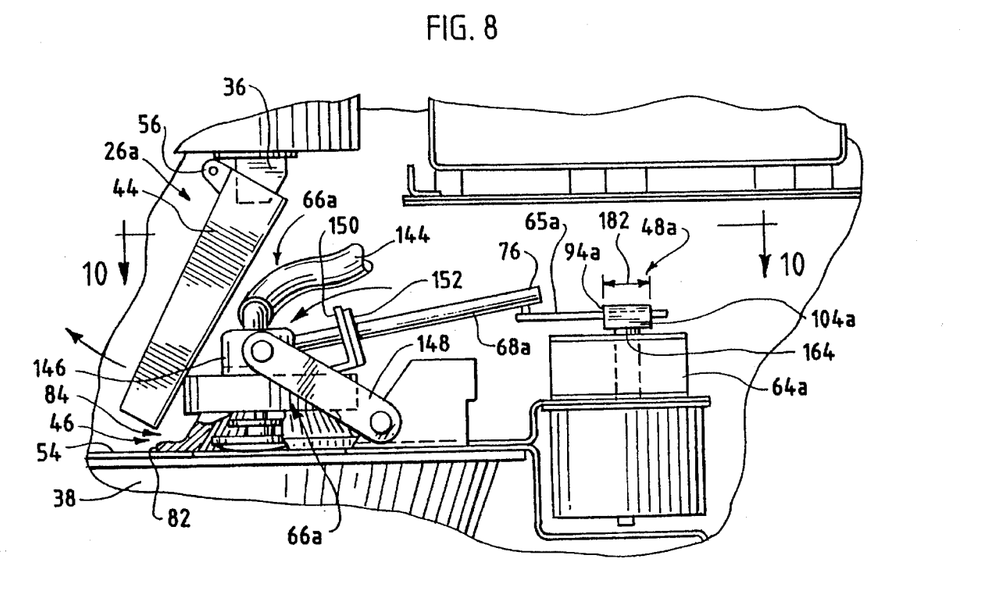
FIG. 8 is a partial fragmentary, cross-sectional, side elevational view similar to that as shown in FIG. 3 showing another embodiment of a water delivery substance dispensing apparatus used in the claimed invention showing details of the movable chute, a retractable carriage assembly, a drive assembly, and position sensing assembly showing a Sprayhead assembly positioned over an aperture.

Turning now to FIGS. 8–12, a second embodiment of the present invention is illustrated and shall be described hereinbelow. It should be noted, that components or elements of the second embodiment which are identical to those as in the first embodiment are represented by the same reference numerals and those which vary in some characteristic but provide essentially the same or a similar function are represented by the same reference numerals with the addition of an alphabetic suffix. For example, in FIG. 3 the carriage assembly is identified by reference numeral 66 whereas the carriage assembly in FIG. 8 is identified by reference numeral 66a.

As shown in FIGS. 8–12, the water delivery and substance dispensing means 26a is generally positioned between the substance dispenser 24 and the brewer 22. As shown, the water delivery and substance dispensing means 26a includes the chute 44, water dispensing means 46, carriage assembly 66a, and drive assembly 48a. The drive assembly 48a is attached to the carriage assembly 66a to pivotally, horizontally and vertically displace the water dispensing assembly 46 relative to the aperture 52 formed in the body 54 of the brewing device 22. Operation of the drive assembly 48a and the water dispensing assembly 46 will be described in further detail hereinbelow.

In general terms, the chute 44 is pivotally attached to the outlet port 36 and leans or rests against the sprayhead assembly 50 of the water dispenser 46. When the drive assembly 48a moves the carriage assembly 66a and the attached water dispensing means 46 away from the position over the aperture 52, the chute 44, leaning or resting against the sprayhead assembly 50 of the water dispensing means 46, moves into a position whereby the chute 44 provides a path from the outlet port 36 through the aperture 52 to the funnel 38.

Figure 9:
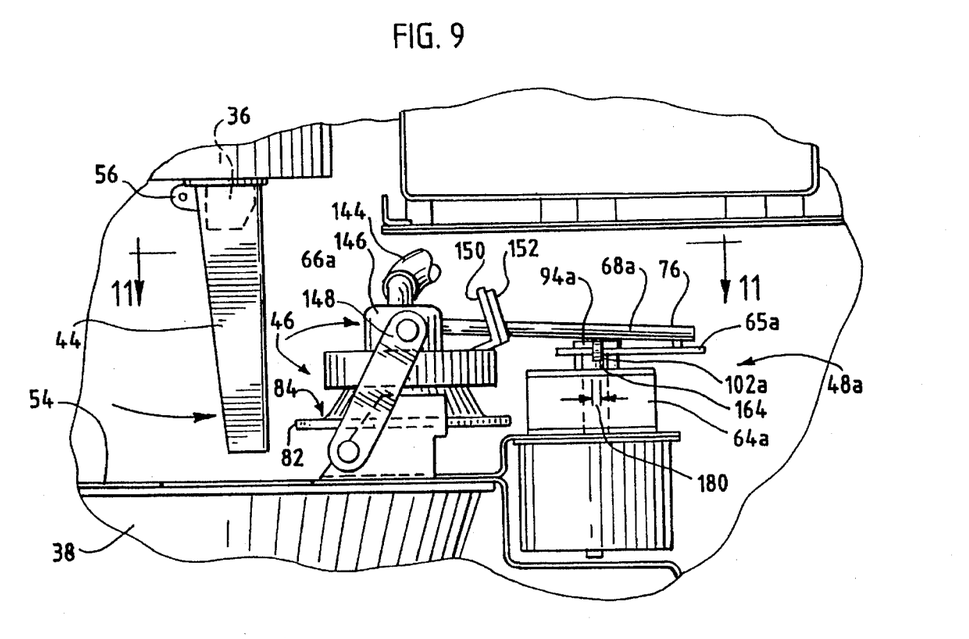
FIG. 9 is a partial fragmentary, cross-sectional, side elevational view similar to that as shown FIG. 8 showing the sprayhead assembly retracted or rotated out of position relative to the aperture.
Figure 10:
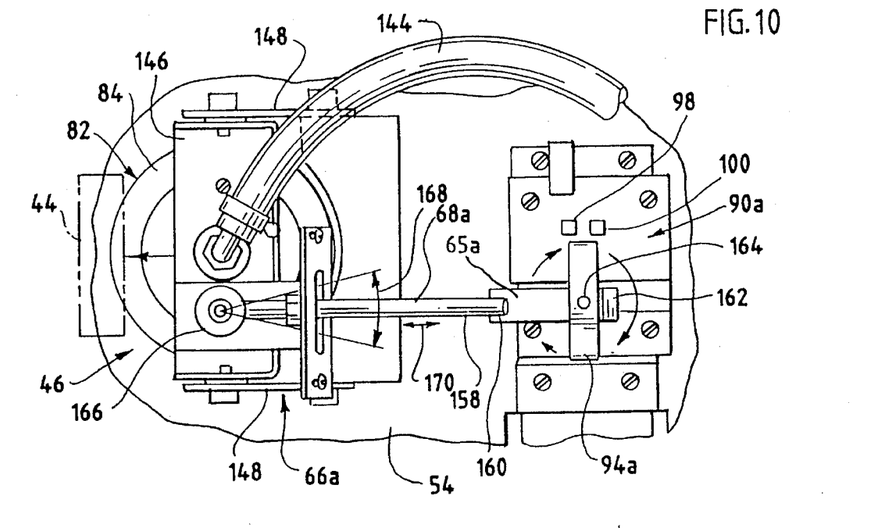
FIG. 10 is a partial fragmentary, plan view taken along line 10—10 in FIG. 8 showing the retractable carriage assembly with the sprayhead assembly attached thereto positioned over the aperture communicating with the receptacle.

Referring now to FIGS. 8–11, FIGS. 8 and 10 show the sprayhead assembly 50 in engagement over the aperture 52 with the chute (the chute 44 is shown in phantom line in FIGS. 10 and 11), positioned away from the aperture 52. The arrangement as shown in FIGS. 8 and 10 allows water to be dispensed from the sprayhead assembly 50 through the aperture 52 to the funnel 38 below. When the drive assembly 48a is operated to move the sprayhead assembly 50 out of communication with the aperture 52, the chute 44 pivots into position aided by the spring hinge 56 to mate with the outlet port 36 and provide a path through which ground coffee may flow from the grinder 34 to the funnel 38.

Figure 11:
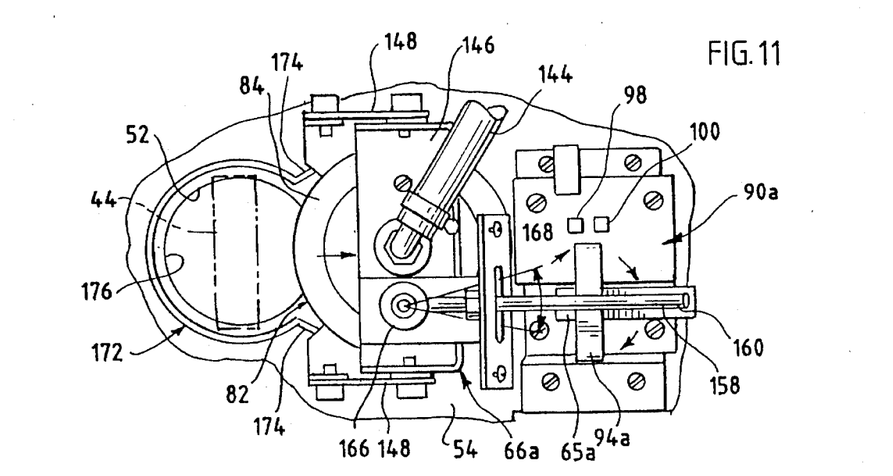
FIG. 11 is a partial fragmentary, plan view taken along line 11—11 in FIG. 9 showing a view similar to the view as shown in FIG. 10 and in which the retractable carriage assembly has been operated by the drive assembly to move the sprayhead assembly away from the aperture to facilitate movement of the movable chute in position to communicate with the aperture.
Figure 12:
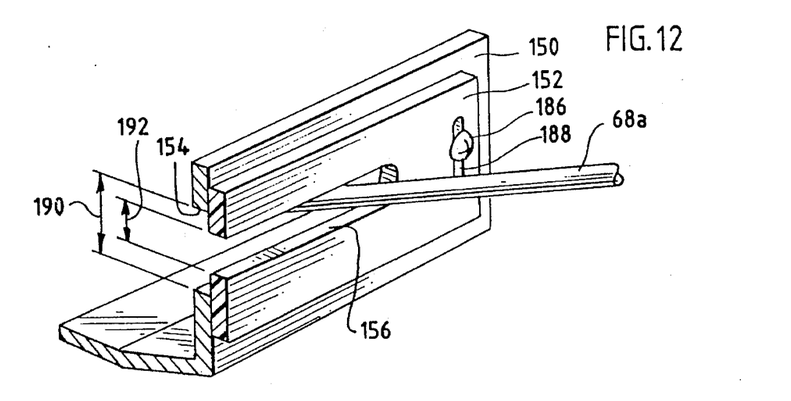
FIG. 12 is an enlarged partial fragmentary, perspective view of a position adjuster assembly which helps to maintain a repeatable attitude to properly position the sprayhead assembly over the aperture.

In the general operation of the present invention, the funnel 38 is removed and a filter material is placed in the funnel 38. The funnel is slidably engaged with the funnel supporting rails 58. The funnel supporting rails 58 retain the funnel in a position below and communicating with the aperture 52 for receiving ground coffee and water therethrough. A selection switch 60 is operated to select the type of coffee from the hoppers 30, 32. Next a brew switch is activated which operates a control device 62 to selectively control the water delivery and substance dispensing means 26. Generally, the control means 63 operates the drive assembly 48a to displace the carriage assembly 66a allowing the chute 44 to drop into position between the outlet port 36 and the aperture. The carriage assembly 66a and chute 44 move form the positions shown in FIGS. 8 and 10 to the position as shown in FIGS. 9 and 11.

The grinder 34 is operated for a predetermined period of time to grind whole bean coffee and dispense coffee grounds through the outlet port 36. The grounds pass from the outlet port 36 through the chute 44 and aperture 52 and into the funnel 38 positioned therebelow. At the end of this grind cycle, the control means 63 operates the motor 62a of the drive assembly 48a to position the water delivery and substance dispensing assembly 26a in position over the aperture 52 pushing the chute 44 out of the way while pivoting. The carriage assembly 66a and chute 44 are moved from the position as shown in FIGS. 9 and 11 to the position as shown in FIGS. 8 and 10. The control means 63 then operates the water distribution system 40 to dispense water through the water dispensing means 46 onto the freshly ground coffee retained in the funnel 38. The ground coffee is infused with the water and a brewed substance is dispensed into the decanter 42.

Turning now to a description of the second embodiment in which greater detail is provided as to the specific components of the embodiment with reference to FIGS. 8–12. As shown, the drive assembly 48a includes a motor 62a, a crank 65a, a linkage or rod 68a. The retractable carriage assembly 66a includes a mounting bracket 146 which is connected to the body 54 by pivot links 148 pivotally connected to opposite ends of the mounting bracket 146.

The sprayhead assembly 50 as shown in the figures includes the sprayhead 80 and the skirt 82 attached to the carriage assembly 66a. The rim 84 of the skirt 82 extends radially away from the opening of the aperture 52 to provide a seal between the body 54 and the skirt 82. The seal prevents the escape of moisture into the brewer and the dispenser 24.

It is important to prevent the escape of moisture so that the components or contents of the apparatus 20 are not adversely affected. One problem that occurs with the escape of moisture is the clumping or clustering of the brewing substance in hoppers. If the beans clump, they cannot flow from the hopper when a gate (not shown) is moved. Since the beans do not flow, flow irregularly or slowly, the measuring of the beans for grinding will be inaccurate. By reducing the escape of moisture from the sprayhead assembly, bean clumping is kept to a minimum and operational problems are prevented.

Accommodations must be made for the skirt 82 in the same manner as described hereinabove with regard to the first embodiment such that the skirt 82 of the sprayhead assembly 50 must be slightly vertically displaced when moving the carriage assembly 66a to disengage the rim 84 from the body 54. The retractable carriage assembly 66a discussed operates to vertically lift the water dispensing assembly 46 upwardly away from the aperture 52 and then arcuately displace the assembly 46 attached to the carriage assembly 66a away from the aperture a predetermined horizontal and vertical dimension. The initial vertical movement of the water dispensing assembly 46 disengages the rim 84 from the body 54 thereby breaking the seal between the sprayhead assembly 50 to allow ease of movement.

A guide bracket 150 is attached to the mounting bracket 146 having a first elongated opening formed therethrough and a bearing plate 152 having a corresponding second opening 154 formed therethrough. The rod 68a of the drive assembly extends through the first and second openings 154, 156 and attaches to the mounting bracket 146. The sprayhead assembly 50 is carried on the mounting bracket 146 so that the sprayhead assembly 50 is pivoted into and out of communication with the aperture 52 upon extending and retracting the carriage assembly 66a under the influence of the drive assembly 48a.

A first end 158 of the rod 68a is attached to a distal end 160 of the crank 65a with an opposite end 162 of the crank attached to a shaft 96 of the motor 62a. A second end 166 of the rod 68a is attached to the mounting plate 146. The connections of the first and second ends 158, 166 to the crank 65a and the mounting bracket 146, respectively, is made by a swivel or ball joint connection. As shown in FIG. 10, when the crank 65a is rotated by the motor, the rod 68a will reciprocally pivot (168) relative to the second end 166 and reciprocally extend and retract (170) relative to the aperture 52 to place the water dispensing assembly 46 in communication with and disengagement from the aperture 52.

The first and second openings 154, 156 are elongated to allow freedom of movement facilitating pivoting (168) of the rod 68a. As shown in FIGS. 8 and 10, when the distal end 160 of the crank 65a is positioned 52, rod 68a is fully extended towards the aperture 52 and hence, the carriage assembly 66a coupled to the rod 68a is positioned with the water distribution assembly 46a over the aperture 52. In this position, the skirt 82 which extends around the sprayhead 80 is positioned to seal the aperture against the escape of moisture. When the crank 652 is rotated to the position as shown in FIGS. 9 and 11, the rod 68a is fully retracted away from the aperture 52 thereby pivoting the carriage assembly 66a away from the aperture 52. Retraction of the rod 68a disengages the water dispensing assembly 46.

A protruding annular rib 172 is provided on the base plate of the apparatus through which the aperture 52 is formed. The annular rib 172 is open-ended towards the motor 62 and terminates in angular arms 174 providing an obtuse angle opening away from the aperture 52. The annular rib 172 is spaced away from the edge of the aperture 52 a sufficient distance to allow the outer edge of the skirt to seat within the boundaries of the annular rib 172. Water which condenses in the area inside the annular rib or which drips from the water dispensing assembly 46 is contained and directed by the annular rib 172, angular arms 174 and a flared flange 176 formed around the inside edge of the aperture 52. As such, any such water drains into the aperture 52 and into the funnel.

A sensor assembly 90a is positioned proximate to the drive assembly 48a and is coupled to the control means 63 to detect and provide information of the position of the water dispensing assembly 90a relative to the aperture 52. The sensor assembly includes a sensor shutter 94a attached to the shaft 96 coupling the crank 65a to the motor 64a. Rotation of the crank 65a by the motor 64a results in the corresponding rotation of the shutter 94a.

First and second detectors 98, 100 are provided on the sensor assembly 90a to sense the position of the shutter 94a by detecting the position of first and second indicators 102a, 104a thereby indicating that the sprayhead assembly is in a predetermined position. First indicator 102a has a width dimension 180, which is less than a corresponding width dimension 182 of the second indicator 104a. Indicators 102a, 104a are flanges which extend downwardly from an elongated panel 184. The indicators 102a, 104a revolve around the shaft 164 as the motor 64a drives the drive assembly. As the indicators pass the detectors they indicate the position of the sprayhead. As shown in FIG. 10, indicator 104a is positioned proximate to the detectors 98, 100 which is interpreted by the detectors as the position in which the sprayhead is positioned over the aperture. When the motor is operated and the crank rotated thereby, the attached shutter 94a is rotated to pass the indicator 102a proximate to the first detector 98. Once the first detector 98 senses the indicator 102a passing a signal is transmitted to the motor which stops the motor's rotation. FIG. 11 shows the resulting condition in which the sprayhead is positioned away from the aperture.

The guide bracket 150 is attached to the mounting bracket 146. The bearing plate 152 is attached to the guide bracket 150 by way of fasteners 186 which extend through elongated apertures 188. The elongated apertures allow the bearing bracket to be adjusted upwardly and downwardly relative to an adjusted position of the rod 68a extending through the first and second openings 154, 156. The first and second openings 154, 156 have width dimension 190, 192, respectively. The width dimension 190 of the first opening 154 is greater than the width dimension 192 of the second opening 156 to accommodate the adjustment range provided by the screws and elongated adjustment apertures 188.

While preferred embodiments of the present invention are shown and described, it is envisioned that those skilled in the art may devise various modifications and equivalents without departing from the spirit and scope of the appended claims. The invention is not intended to be limited by the foregoing disclosure.

The invention claimed is:

1. A beverage brewing apparatus including a beverage brewer and brewing substance dispenser, said beverage brewer comprising:

a receptacle for retaining a beverage brewing substance;

said brewing substance dispenser being operatively associated with said receptacle for controllably dispensing brewing substance into said receptacle;

a chute positioned between said substance dispenser and said receptacle for selectively directing brewing substance from said substance dispenser to said receptacle;

a water dispenser operatively associated with said beverage brewer and selectively communicating with said receptacle for delivering water to a brewing substance retained in said receptacle; and a drive assembly for selectively alternately moving one of said water dispenser and said chute for controllably displacing the other of said water dispenser and said chute, whereby said water dispenser and said chute controllably, individually communicate with said receptacle.

2. A beverage brewing apparatus as recited in claim 1, said brewing substance dispensing means further comprising a hopper and a brewing substance grinder positioned for receiving brewing substance from said hopper, said brewing substance grinder dispensing ground brewing substance to said chute.

3. A beverage brewing apparatus as recited in claim 1, said water dispenser including a water line and a sprayhead attached to said water line, said sprayhead distributing water over brewing substance retained in said receptacle.

4. A beverage brewing apparatus as recited in claim 1, said water dispenser further comprising:

sealing means associated with said sprayhead for preventing the escape of moisture from said water dispenser.

5. A beverage brewing apparatus as recited in claim 4, wherein said drive assembly vertically displaces said sprayhead for disengaging said sealing means and horizontally displaces said sprayhead after disengaging said sealing means.

6. A beverage brewing apparatus as recited in claim 1, said drive assembly being connected to said water dispenser for moving said water dispenser relative to said receptacle, said chute communicating with said receptacle when said drive assembly moves said water dispenser away from said receptacle and said chute being moved out of communication by said water dispenser when said drive assembly moves said water dispenser into communication with said receptacle.

7. A beverage brewing apparatus as recited in claim 1, further comprising a receptacle sensor associated with said receptacle for indicating when said receptacle is in a desired location relative to said brewer.

8. A brewing apparatus including beverage brewing means and brewing substance dispensing means, said brewing apparatus comprising:

a receptacle for retaining a brewing substance being positioned relative to said brewing substance dispensing means for receiving brewing substance therefrom and said brewing means for receiving brewing water therefrom;

a sensor operatively associated with said receptacle for indicating when said receptacle is positioned in a desired location relative to said substance dispensing means and said brewing means;

a chute positioned between said substance dispensing means and said receptacle for selectively directing brewing substance from said substance dispensing means to said receptacle;

water dispensing means operatively associated with said beverage brewing means and selectively communicating with said receptacle for delivering water to a brewing substance retained in said receptacle;

drive means being operatively associated with one of said chute and said water dispensing means and for controllably displacing the other of said chute and said water dispensing means, whereby said chute and said water dispensing means controllably, individually communicate with said receptacle; and control means operatively associated with said drive means, said sensor and said substance dispensing means for synchronously operating said brewing apparatus, whereby said sensor must indicate a receptacle positioned in a desired location and said dive means must position said water dispensing means in communication with said receptacle before said beverage brewing means can operate.

9. A beverage brewing apparatus including a beverage brewer and a brewing substance dispenser, said beverage brewing apparatus comprising:

a receptacle for receiving a beverage brewing substance;

said brewing substance dispenser being operatively associated with said receptacle for controllably dispensing brewing substance into said receptacle;

a movable chute positioned between said substance dispenser and said receptacle for directing brewing substance from said substance dispenser to said receptacle;

a water dispensing assembly communicating with said beverage brewer for delivering water to a beverage brewing substance retained in said receptacles;

a carriage assembly positioned proximate to said receptacle and being pivotably movable relative thereto, said water dispensing assembly being carried on said carriage assembly for selectively positioning said water dispensing assembly in communication with said receptacle; and a drive assembly connected to said carriage assembly for selectively moving said carriage assembly to controllably displace said water dispensing assembly relative to said receptacle and said chute, whereby said water dispensing assembly and said chute controllably, individually communicates with said receptacle.

10. A beverage brewing apparatus as recited in claim 9, further comprising:

said chute having at least one wall;

said substance dispenser having an outlet port through which brewing substance is dispensed;

a hinge attached to said wall of said chute and proximate to said outlet port of said substance dispenser, said chute being movable relative to said hinge for placing said chute in communication with said outlet port.

11. A beverage brewing apparatus as recited in claim 9, said brewing substance dispenser further comprising a hopper and a brewing substance grinder positioned for receiving brewing substance from said hopper, said brewing substance grinder dispensing ground brewing substance to said outlet port for dispensing along said chute.

12. A beverage brewing apparatus as recited in claim 9, said water dispensing assembly including a sprayhead and a water line attached to said sprayhead, said sprayhead distributing water from said water line over said brewing substance retained in said receptacle when said drive assembly operates said carriage assembly to position said sprayhead over said receptacle.

13. A beverage brewing apparatus as recited in claim 12, said water dispensing assembly further comprising:

a covering boot surrounding said sprayhead, said covering boot abutting a surface surrounding said receptacle for preventing the escape of moisture from said sprayhead when said sprayhead dispenses water over said brewing substance retained in said receptacle.

14. A beverage brewing apparatus as recited in claim 13, wherein said drive assembly pivotably displaces said carriage assembly and said pivotable displacement includes a vertical component and a horizontal component, said vertical component disengaging said covering boot and said horizontal component displacing said water dispensing assembly away from said receptacle to allow communication of said movable chute with said receptacle.

15. A beverage brewing apparatus as recited in claim 9, said drive assembly being connected to said carriage means for moving said water dispensing assembly attached to said carriage assembly relative to said receptacle, said movable chute communicating with said receptacle when said drive assembly moves said water dispensing assembly away from said receptacle and said chute being moved out of communication by said water dispensing assembly when said drive assembly moves said water dispensing assembly into communication with said receptacle.

16. A beverage brewing apparatus as recited in claim 9, further comprising:

a position sensor assembly coupled to said beverage brewing apparatus for detecting position of said water dispensing assembly relative to said receptacle, said position sensor assembly being coupled to said drive assembly for effecting the operation of said drive assembly to position said water dispensing assembly in a desired position relative to said receptacle.

17. A beverage brewing apparatus as recited in claim 9, said drive assembly further comprising:

a motor having a shaft extending therefrom providing rotary movement of said shaft;

a crank attached to said shaft and radially extending therefrom;

a rod pivotably attached to said crank at an end of said crank distal said connection to said shaft;

a second end of said rod attached to said carriage assembly.

18. A beverage brewing apparatus as recited in claim 17, said carriage assembly further comprising:

a mounting bracket, said water dispensing assembly depending from said mounting bracket;

at least one pivot link attached to said mounting bracket and to a stationary portion of said brewing apparatus, a first end of said pivot link being rotatably attached to said mounting bracket and a second end of said pivot link pivotally attached to said beverage brewing apparatus;

a rod guide depending from said mounting bracket, an elongated aperture formed in said rod guide, said rod extending through said elongated aperture with said second end of said rod attaching to said mounting bracket.

19. A beverage brewing apparatus as recited in claim 18, said shutter comprising an elongated member with first and second indicator tabs extending from opposite ends thereof, each of said first and second indicator tabs passing in close proximity to said at least one detector for providing positioning information.

20. A beverage brewing apparatus as recited in claim 17, said carriage assembly further comprising:

a pivot lever, said sprayhead assembly being disposed on said pivot lever for pivotal movement of said sprayhead assembly;

a pivot block attached to a stationary portion;

a pivot shaft coupled to said pivot lever and said pivot block for retaining said pivot lever in proximity to said pivot block;

a vertical displacing device retained on at least one of said pivot lever and said pivot block for vertically displacing said pivot lever relative to said pivot block when said pivot lever is rotated relative to said pivot block when said rod attached to said pivot lever is operated by said motor attached to said rod;

21. A beverage brewing apparatus as recited in claim 17, further comprising a position sensor including a shutter attached to said crank for rotating with said crank upon operation of said motor; detectors attached to said beverage brewing apparatus in the path of movement of said shutter when said shutter is moved by operation of said motor; a first indicator of said shutter having a dimension which is different from said second indicator, said first and second indicators being positioned proximate to said detectors for indicating the position of said crank which translates into the movement of said carriage assembly coupled thereto.

* * * * *

UNITED STATES PATENT AND TRADEMARK OFFICE
CERTIFICATE OF CORRECTION

PATENT NO. : 5,511,465
DATED : April 30, 1996
INVENTOR(S) : Brent R. Friedrich and John T. Knepler It is certified that error appears in the above-indentified patent and that said Letters Patent is hereby corrected as shown below:

Column 10, Line 49 "form" should be -- from --

Column 12, Line 8 "crank 652" should be -- crank 65a --

Column 14, Line 23 "said dive" should be -- said drive --

Signed and Sealed this

Twelfth Day of November, 1996

Attest:

BRUCE LEHMAN

Attesting Officer    Commissioner of Patents and Trademarks